United States Patent

Ueta et al.

[11] Patent Number: 5,237,509
[45] Date of Patent: Aug. 17, 1993

[54] METHOD AND APPARATUS FOR COMPENSATING POSITIONAL ERRORS

[75] Inventors: Toshihiro Ueta, Mishima; Masahito Shiozaki, Nagaizumi; Jun Fujita, Numazu, all of Japan

[73] Assignee: Toshiba Kikai Kabushiki Kaisha, Tokyo, Japan

[21] Appl. No.: 666,783

[22] Filed: Mar. 8, 1991

[30] Foreign Application Priority Data

Mar. 9, 1990 [JP] Japan .................................. 2-59423

[51] Int. Cl.⁵ ............................................. G05B 19/19
[52] U.S. Cl. ........................... 364/474.35; 364/474.28; 318/632
[58] Field of Search ..................... 364/167.01, 474.18, 364/474.28, 474.35; 318/561, 572, 569, 632

[56] References Cited

U.S. PATENT DOCUMENTS 4,396,975 8/1983 Kurakake ........................ 364/474.35
4,603,391 7/1986 Inoue et al. ..................... 364/474.35

Primary Examiner—Jerry Smith
Assistant Examiner—Paul Gordon
Attorney, Agent, or Firm—Koda and Androlia

[57] ABSTRACT

In a numerical control of a machine tool, the relation between the total number of instructions, or the range of movement of the movable member of the machine tool and the actual amount of movement is not represented by a straight line but periodically change sinusoidally over substantially equal ranges of movement, due to a lead error of a ball screw used for moving the movable element. For the purpose of correctly compensate the position error in a short time, the total range of movement of the movable element is divided into a plurality of ranges, and start and end points of movement, types of movement of respective ranges and periods thereof are stored in memory means. The actual position of the movable element and the data stored in the memory means are used to correct the actual position of the movable member.

8 Claims, 9 Drawing Sheets

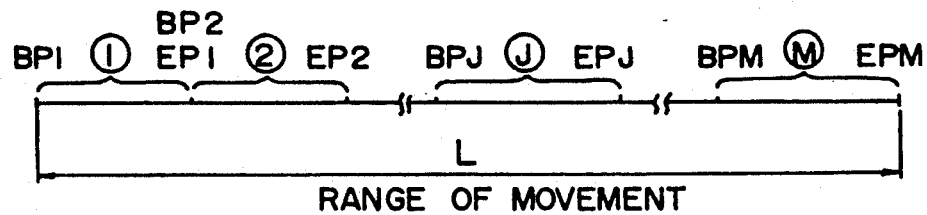
FIG. 3
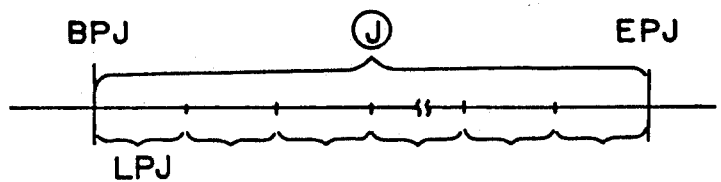
FIG. 4
| | COORDINATE OF LEADING POINT OF SECTION | COORDINATE OF END POINT OF SECTION | LENGTH OF DIVIDED RANGE |
|---|---|---|---|
| TYPE OF PATTERN | $A(1,1) = BP1$ | $A(1,2) = EP1$ | $A(1,3) = LP1$ |
| | $A(2,1) = BP2$ | $A(2,2) = EP2$ | $A(2,3) = LP2$ |
| | $A(J,1) = BPJ$ | $A(J,2) = EPJ$ | $A(J,3) = LPJ$ |
| | $A(M,1) = BPM$ | $A(M,2) = EPM$ | $A(M,3) = LPM$ |
FIG. 5

| | NO OF SMALL SECTION | | | |
|---|---|---|---|---|
| TYPE OF PATTERN | 1 | 2 | 3 | K |
| 1 | C(1,1) | C(1,2) | C(1,3) | C(1,K) |
| 2 | C(2,1) | C(2,2) | C(2,3) | C(2,K) |
| J | C(J,1) | C(J,2) | C(J,3) | C(J,K) |
| M | C(M,1) | C(M,2) | C(M,3) | C(M,K) |

METHOD AND APPARATUS FOR COMPENSATING POSITIONAL ERRORS

BACKGROUND OF THE INVENTION

This invention relates to a method and apparatus for compensating or correcting a positional error of numerical control apparatus which controls the movement of a movable member of a machine tool or the like.

In a numerically controlled machine tool a positional error occurs due to a pitch error or the like at the time of positioning the machine or passage control. For this reason, a numerical control apparatus is generally equipped with a position error compensating device. The position error is compensated for with the following method. For example, the range of movement of each shaft of the movable member of the machine is divided into a plurality of sections. For example, the range of movement in a X axis direction is divided into $Xi$ ($i=1, 2, 3, \ldots$) sections and the amount of compensation $EXi$ ($i=1, 2, 3, \ldots$) of each section is measured and stored in a memory device. When the present position, in the X axis direction of the movable member of the machine enters into a predetermined region $AX1$, the present position, in the X axis direction of the movable member of the machine is compensated for based on the amount of compensation $EXi$ and in the directions in the positive direction or negative direction of movement of the machine.

In the prior art numerical value control apparatus, since a region in which the machine is positioned and a corresponding position compensation data are stored as a pair so as to compensate for the position error based on the stored data. As a consequence, the position error would vary in such a short distance, for example a movement error caused by a lead error which occurs at each rotation at the time of manufacturing a ball screw. Where such variation pattern occurs repeatedly in the range of movement of the movable member, it is necessary to increase the number of divisions (that is to decrease the length of the divided section) in order to effect a highly accurate compensation. Where there is a limit on the memory device that stores the compensation data, the number of compensation points would become deficient. Otherwise, it is necessary to increase the capacity of the memory device. Even when the memory device has an ample capacity it is necessary to store several times similar data occurring at each rotation of a ball screw over the entire range of movement.

SUMMARY OF THE INVENTION

Accordingly, it is an object of this invention to provide a novel method and apparatus capable of effecting position error compensation which can efficiently effect a position error compensation at high accuracies as well as passage control by using a smaller number of stored compensation data and shorter interval of correction.

Another object of this invention is to provide a novel method and apparatus for effecting a position error compensation capable of reducing the number of data input points utilized to correct the position error, thereby reducing the time necessary for data setting.

These advantages are particularly effective where there are a number of regions in which the same patterns of position error variations occur in a given range of movement of the movable element.

According to one aspect of this invention there is provided a method of compensating position error of a numerical control apparatus that controls a movement of a movable member of a machine tool, comprising the steps of: dividing a range of movement of the movable element into a plurality of small sections corresponding to a plurality of types of repeating position error patterns, in each of the small sections, a configuration of a position error curve repeating in a same pattern; storing in memory means coordinates of a movement start and end point and a length of one period of a pattern repeated in any one of the small sections; dividing the pattern into small sections, each having a length shorter than a length of each period of respective patterns corresponding to types of respective pattern; storing position errors in the memory means position errors respectively corresponding to the divided small sections; supervising an instructed position or a present position corresponding thereto of the movable member; determining whether the supervised position is in a small section in which the pattern is repeated and whether the supervised position lies in which one of the small sections in one period of the pattern; and determining a position error corresponding to a small section in which the movable member is positioned based on the stored values of the position errors corresponding to the small sections, thereby compensating for the position of said movable member by the determined error.

According to another aspect of this invention there is provided apparatus for compensating a position error of numerical control apparatus that controls a movement of a movable member of a machine tool, comprising a NC data reader for reading out a NC program; a keyboard, a main portion of the numerical control apparatus including a program analyzer for applying the NC program to data memory means storing a relation between an instructed position and an actual position of the movable member and a signal from the keyboard, and a position compensation quantity calculating unit connected to the memory means for producing a present position compensating signal $Cx$; a first adder for obtaining a difference between an output $Xc$ of the program analyzer and a present position of the movable member; a servo control device connected to the program analyzer through the first adder for driving a motor for driving the movable member, means for detecting an actual position of the movable member for applying a feedback signal to the position compensation quantity calculating unit; and a second adder which calculates a difference between the feedback signal and the present position compensation signal $Xc$ for applying a difference signal to the first adder.

BRIEF DESCRIPTION OF THE DRAWINGS

In the accompanying drawings:

FIG. 3 is a schematic view showing the relationship between the type of the position error pattern and corresponding coordinate sections;

FIG. 4 is a schematic view showing the relationship between the length of one period of the position error pattern and the coordinate section corresponding to the type of the position error pattern;

FIG. 5 is a data table showing the relationships shown in FIGS. 3 and 4;

DESCRIPTION OF THE PREFERRED EMBODIMENTS

Figure 1:
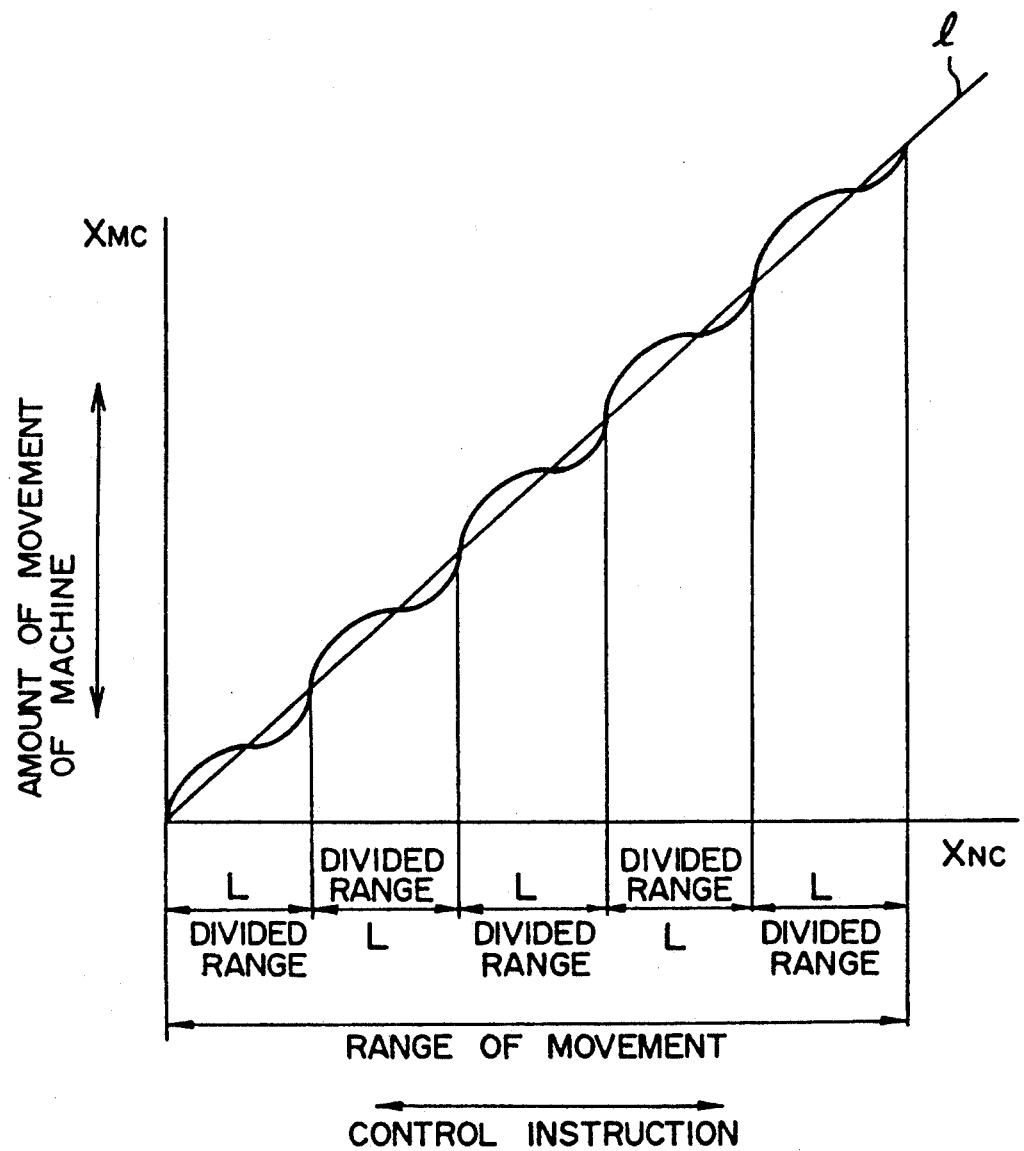
FIG. 1 is a graph showing a case wherein the relationship between a movement instruction value and the response position of a mechanical movable member can be shown by the same position error pattern.

The method of compensating for a position error of this invention will now be described with reference to the accompanying drawings. FIG. 1 shows a graph wherein a straight line 1 representing ideal response positions of the movable member of the machine corresponding to respective position instructions is superposed on position errors repeating with the same pattern (of a sinusoidal waveform) in respective divided sections, each having a length L. In the same manner, in FIG. 2 the error pattern is shown by two sinusoidal pattern waves 1 and 2.

Figure 2:
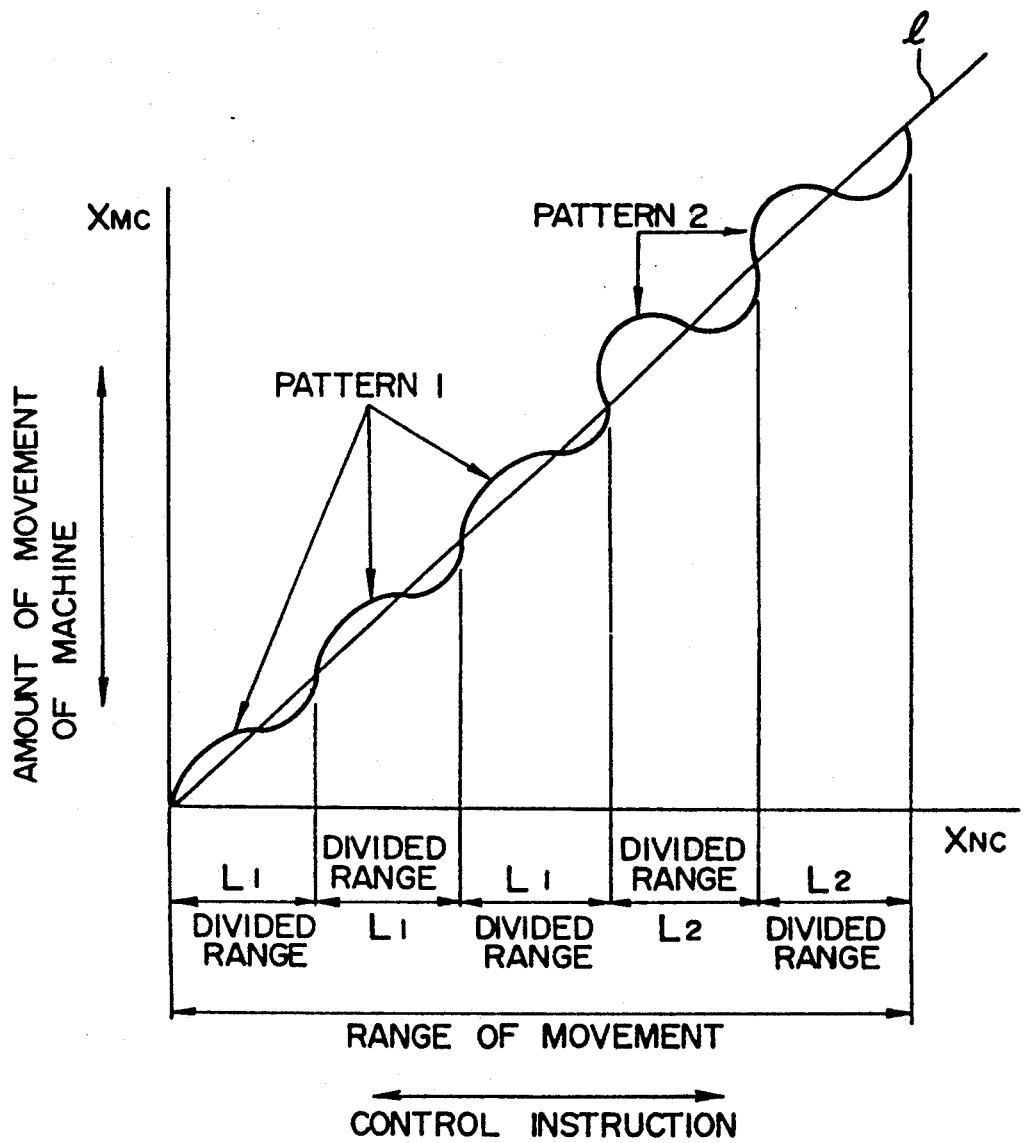
FIG. 2 is a graph showing a case wherein the relationship between the movement instruction value and the response position of a machine movable member can be shown by two position error patterns.

In the following, how to compensate for the position errors shown in FIGS. 1 and 2 by using least number of correction data will be described. In FIG. 3, the range of movement of the movable member is divided into several sections. In each section, the same patterns 1 or 2 shown in FIG. 2 are repeated. In FIG. 3, a region ① shows a section in which the first pattern 1 shown in FIG. 2 is repeated, while section Ⓙ represents a section in which a Jth pattern is repeated. In FIG. 3, BP1 shows a first coordinate position of a section in which the first pattern is repeated, whereas EP1 represents the coordinate position at which the section terminates in which the first pattern is repeated. In the same manner BPJ designates the first coordinate position at which a section starts in which the Jth pattern is repeated, whereas EPJ designates the coordinate position at which a section terminates in which the Jth pattern is repeated. The lengths of sections ①②... Ⓙ... Ⓜ are selected to be integer multiples of the period of a pattern repeated in each section as shown in FIG. 4 which shows the section Ⓙ.

Figures 6, 7:
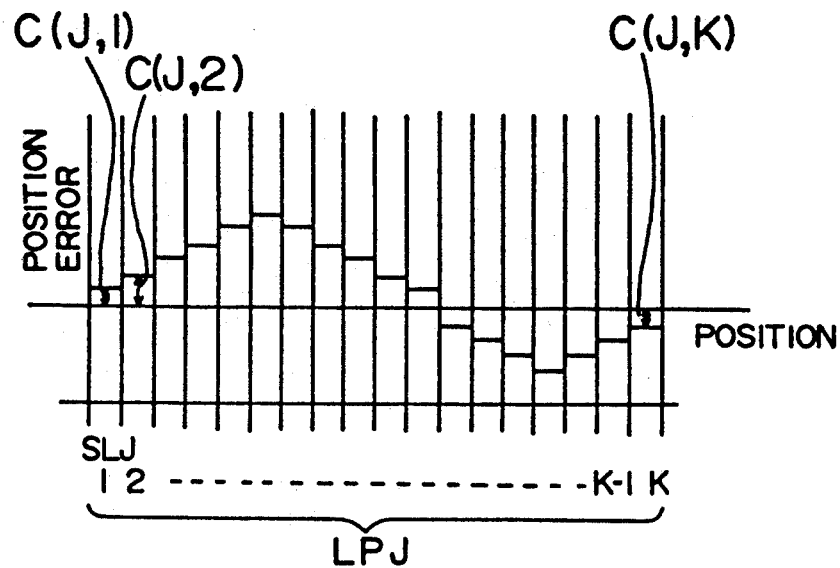
FIG. 6 is a graph showing the relationship between subsections in one period of the position error pattern and the position error values corresponding to respective subsections.
FIG. 7 is a data table showing the position error data of respective divided sections corresponding to the types of respective patterns.

FIG. 5 is a data table showing numerical data showing the states shown in FIG. 3 and 4. The states shown in FIGS. 3 and 4 can be shown by a matrix made up of M lines and three columns, where M represents the types of the patterns used. Thus for example (J.1) shows the type of the Jth pattern, A(J.2) shows the coordinate value EPJ of the end point of section Ⓙ, and A(J.3) represents the length LPJ of the period corresponding to the type of the Jth pattern. The graph shown in FIG. 6 is used to derive out data to be used for correcting a position error from the patterns of respective position error curves, for example from the pattern of the position error curve of the Jth type. The length LPJ of the period of one pattern is divided into a plurality of K small sections each having a length SLJ so as to determine a position error corresponding to any one of small sections SLJ by using the position error curve.

FIG. 7 is a data table showing position error data of small sections corresponding to the types of respective patterns. In FIG. 7 C(j.k) represents the position error data of the Kth small section of the Jth pattern type.

Figure 8:
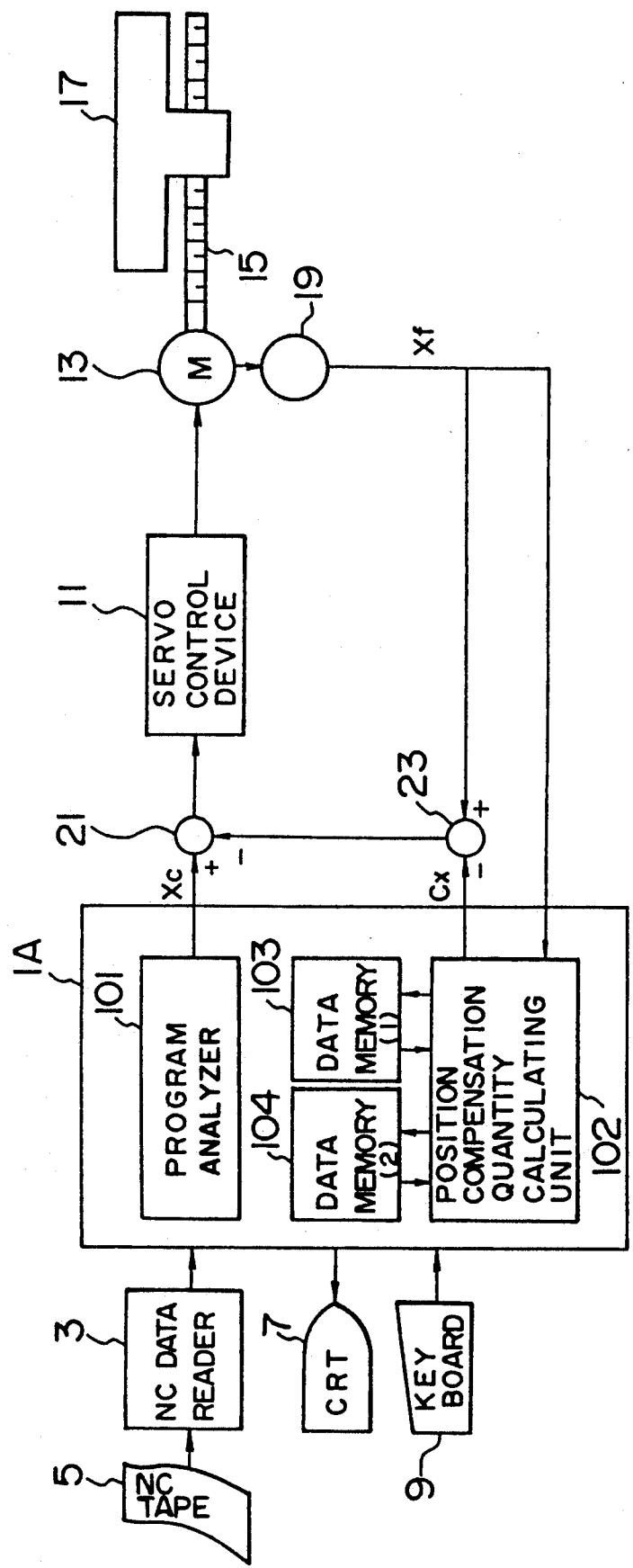
FIG. 8 is a block diagram showing one embodiment of the numerical value control apparatus for effecting position error compensation.

FIG. 8 is a block diagram showing a numerical control apparatus for compensating for the position error embodying the invention. The control apparatus shown in FIG. 3 comprise a main portion 1A of the numerical control apparatus, a NC data read out device 3 for reading out a NC data from a NC type 5, a cathode ray tube (CRT) 7, a keyboard 9, a servo control device 11, an electric motor 13, a ball screw 15, a movable member, for example a table 17 of the machine tool, and a position detector 19. The main body 1A of the numerical control apparatus comprises a NC program analyzer 101, a position compensation quantity calculating unit 102, a data memory devices 103 and 104. The relation between the position instruction and an actual response position is premeasured, which is used for determining the relations as shown in FIGS. 3 and 4 and for preparing data shown in the data table shown in FIG. 5. These data are inputted and stored in data memory device 103 via keyboard 9 and NC table 5. The length of one period of each position error pattern is divided into a plurality of small sections as shown in FIG. 6 and the data as shown in FIG. 7 are inputted and stored in the data memory device 104 via keyboard 9 or NC table 5.

In FIG. 8, the NC program which has been read from NC table 5 through NC data reading device 3 is analyzed by a program analyzer 101 and its output Xc is applied to an adder 21 for obtaining the difference between output Xc and the present position, and the difference thus obtained is applied to a servo control device 11 to act as a movement instruction. The servo control device 11 controls the motor 13 to rotate ball screw 15 for determining the position of the movable member 17 of the machine tool. The position of the movable member 17 is detected by a position detector 19 which measures the rotational position of the rotor of the motor 13 and a signal Xf detected by the position detector 19 is fed back to the position compensation quantity calculating unit 102 of the numerical control apparatus 1A via an adder 23.

The position compensation quantity calculating unit 102 compares the fed back signal Xf with data being stored in the data memory device 1(103). More particularly where it is confirmed that the signal Xf lies in a section between A(J.1) and A(J.2) that is between coordinate positions BPJ and EPJ, the value of J is determined and then the following calculations are performed $$a = \{Xf - A(J.1)\} \% LPJ \quad (1)$$
$$= (Xf - BPJ) \% LPJ$$

Denoting $\{Xf - A(J.1)\}$ by X and LPJ by Y, X%Y represents a surplus obtainable by dividing X with Y. Thus a represents the difference between the length of (Xf− BPJ) and an integer multiple of the length LPJ of the period of a pattern.

$$b = a/(LPJ/K) \quad (2)$$
$$= a/SLJ$$

where b represents a positive integer.

As above described b represents the position of b in a given small section. After determining J and b a position error quantity Cx=C(J.b) can be read out from the data memory device (2)104. The value of Cx=C(J.b) is applied to adder 23 from position compensation calculating unit 102 to act as a present position correcting value.

Figure 9:
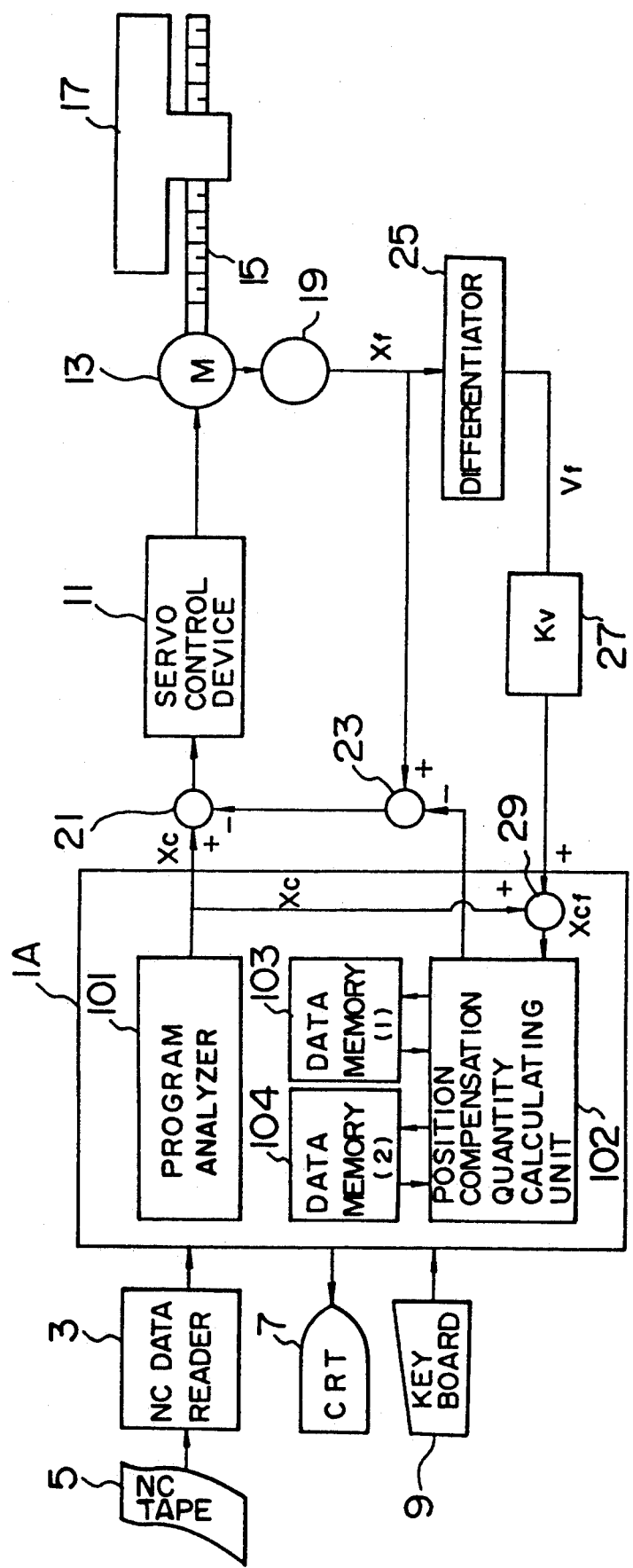
FIG. 9 shows a modification of the numerical value control apparatus shown in FIG. 8.

The adder 23 calculates a value (Xf−Cx) and this value is applied to adder 21 as a feedback value for the present position p.14. FIG. 9 is a block diagram showing a modified embodiment of this invention in which instead of using the detected position Xf an instruction value Xc is used for determining the correction value of the position. Elements similar or identical to those shown in FIG. 8 are designated by the same reference numerals. In this case, at the time of determining a position error corresponding to an instruction value, since an error is caused due to a delay of a servo system an instruction Xc is corrected by differentiating the detected present position Xf with a differentiator 25 to obtain speed Vf and then multiplying Vf with a coefficient Kv with a multiplier 27, thus compensating for the instruction value. More particularly $$Xcf = Xc + Kv \times Vf$$

where Kv designates a multiplier determined by a position loop gain, and Xcf is calculated by adder 29. The position compensation quantity calculating unit 102 calculates a position error corresponding to a small section by using Xcf instead of Xf in equations (1) and (2). In this manner the position compensation can be obtained in the same manner as in FIG. 8.

Figure 10:
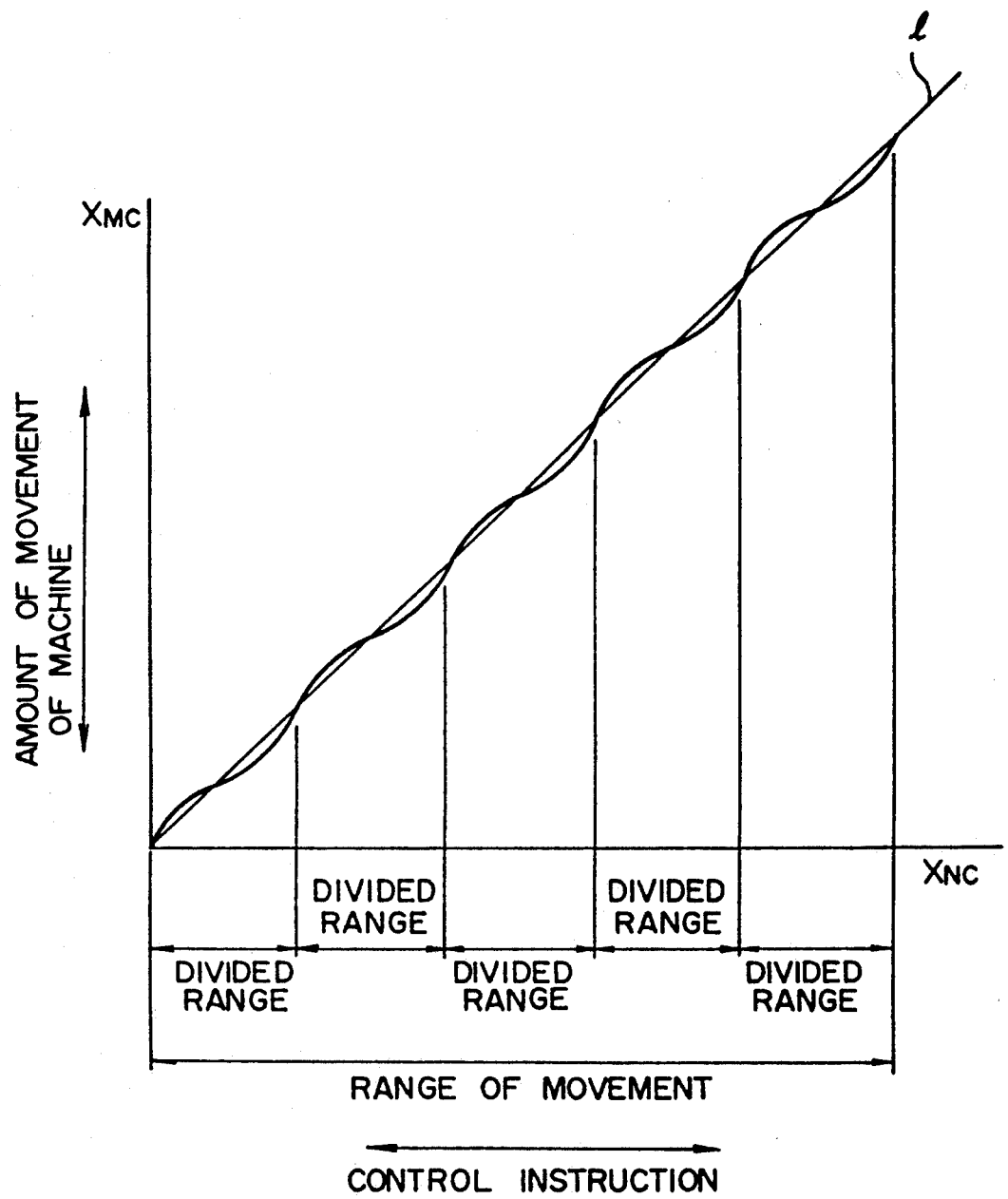
FIG. 10 is a graph showing a case wherein the position error compensation method of this invention is applied to a model shown by the position error pattern shown in FIG. 1.

FIG. 10 is a graph showing the result of compensation effected by this invention for the graph shown in FIG. 1.

Figure 11:
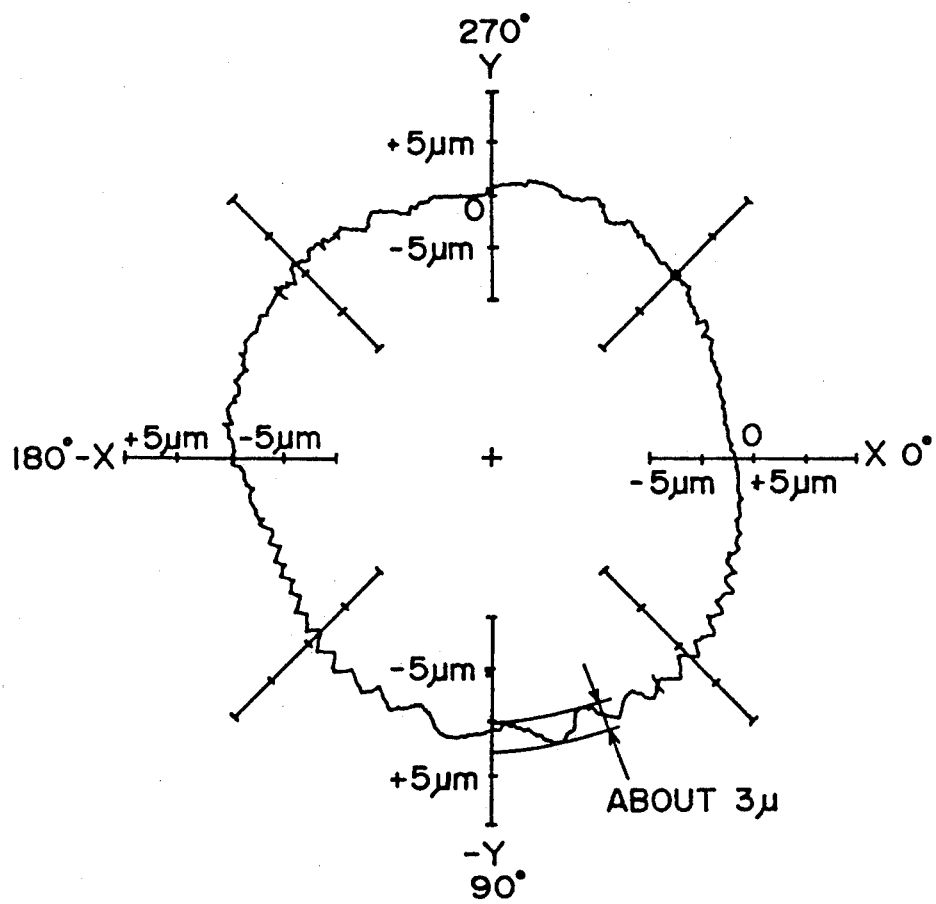
FIG. 11 is a graph showing the movement accuracy of a machining center.

FIG. 11 is a graph showing a movement accuracy of a machining center which was measured by a double ball method (DBB). This graph shows variations of about 3 μ caused by the ball screw.

Figure 12:
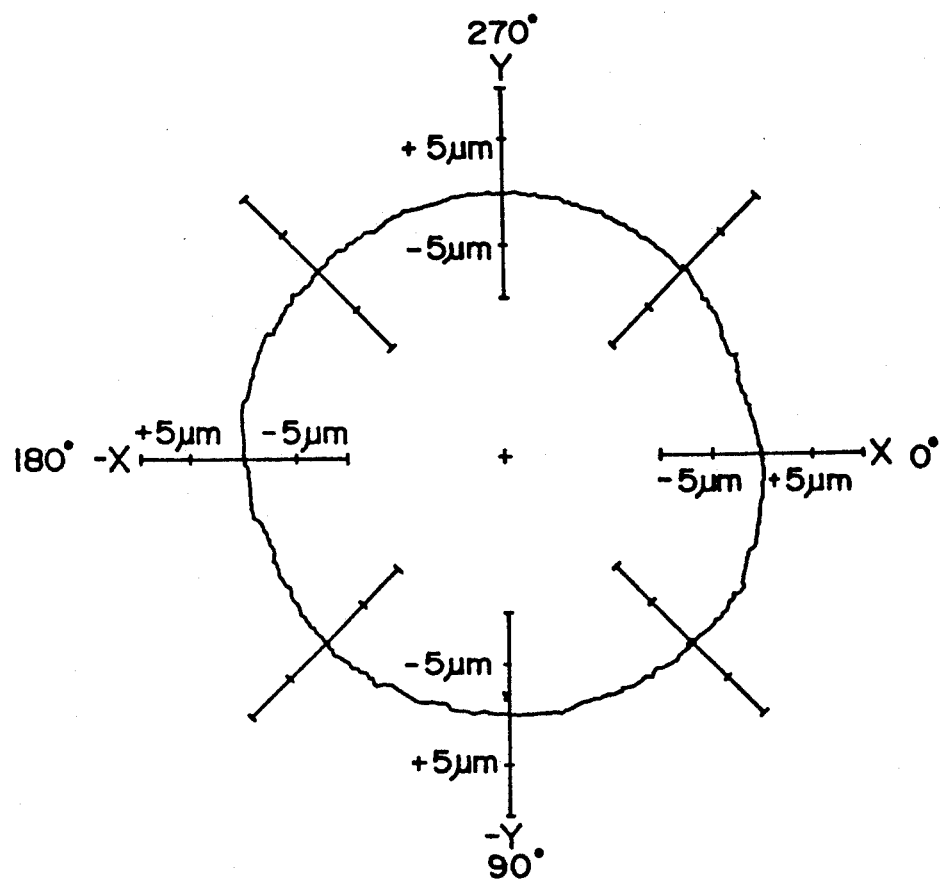
FIG. 12 is a graph showing the result obtained by applying the position error compensation method to the machining center having the movement accuracy shown in FIG. 11.

FIG. 12 is a graph showing a movement accuracy of a case wherein the position error compensating method of this invention is applied and the movement accuracy was measured with double ball method. As can be noted from FIG. 12, the movement accuracy was improved to only about 0.5 μ.

As above described according to the method and apparatus of this invention for compensating for a position error corresponding to an instructed position of the movable member of a machine is represented by a pattern of the position error and stored in a memory device, the number of data stored in the memory device for effecting compensation of the position error can be reduced even though the interval of correction is shortened. In other words accurate positioning becomes possible by storing a smaller number of position error compensating data. Moreover it is possible to reduce the operator's time necessary for data input operation for inputting position error compensating data in the memory device.

What is claimed is:

1. A method of compensating a position error of a numerical control apparatus that controls a movement of a movable member of a machine tool, comprising;
   a step of dividing a range of movement of said movable member into a plurality of sections corresponding to a plurality of types of repeating position error pattern;
   a step of, in each of said sections, a configuration of a position error curve repeating in a same pattern;
   a step of storing in memory means coordinates of a movement start point and end point and a length of one period of a pattern repeated in any one of said sections;
   a step of dividing said pattern into small sections, each having a length shorter than a length of each period of respective patterns corresponding to types of respective patterns; and
   a step of compensating for the position errors by using said small sections.

2. A method of compensating a position error of a numerical control apparatus that controls a movement of a movable member of a machine tool, comprising:
   a step of dividing said movement into a plurality of small sections in which a configuration of a position error is repeated;
   a step of detecting a present position of said movable member in any one of said small sections;
   a step of determining the present position of said movable member;
   a step of determining the present position of said movable member in any one of said small sections by using presorted data; and
   a step of determining a position error quantity and a position error quantity corresponding to each small sections.

3. A method of compensating a position error of a numerical control apparatus that controls a movement of a movable member of a machine tool, comprising:
   a step of dividing said movement into a plurality of small sections;
   a step of detecting a first present position of the movable element;
   a step of determining the first present position of the movable element;
   a step of determining a second present position of the movable element in a region in which position error patterns are repeated;
   a step of determining a third present position of the movable element in which one of the divided region, all of said determining being made in accordance with presorted data, determining a pattern of the position error and a position error quantity by using prestored data;
   a step of correcting a detected present position data using said position error quantity; and
   a step of positioning said movable member at a correct position by feeding back said corrected position data to said numerical control apparatus.

4. Apparatus for compensating a position error of numerical control apparatus that controls a movement of a movable member of a machine tool, comprising:
   an NC data reader for reading out an NC program;
   a keyboard;
   a main portion of said numerical control apparatus connected to receive an NC data read out by said NC data reader and an output of said keyboard;
   a program analyzer adapted in said main portion and for analyzing said NC program to be output;

data memory means adapted in said main portion and having at least two kinds of memories, for receiving said NC program from said program analyzer and for storing a relation between an instructed position and an actual position of said movable member and a signal from said keyboard;

a position compensation quantity calculating unit connected to said data memory means for producing a present position compensating signal Cx;

a first adder for obtaining a difference between an output Xc of said program analyzer and a present position of said movable member;

a servo control device connected to said program analyzer through said first adder for driving a motor for moving said movable member;

means for detecting an actual position of said movable member for applying a feedback signal to said position compensation quantity calculating unit; and a second adder receiving said feedback signal from said calculating means for detecting an actual position of said movable member, and for calculating a difference between said feedback signal and said present position compensation signal Xc for applying a difference signal to said first adder.

5. The apparatus according to claim 4 which further comprises a differentiator for producing a differentiated signal Vf to a third adder for applying its output signal Xcf to said position compensation quantity calculating unit for calculating a position error.

6. The apparatus according to claim 4 wherein one of said data memory means exchanges a position error quantity Cx between this data memory means and said position compensation quantity calculating unit.

7. The apparatus according to claim 4 wherein the other one of said data memory means exchanges a correction signal between this data memory means and said position compensation quantity calculating unit.

8. Numerical control apparatus for controlling movement of a movable member of a machine tool comprising:

first division means for dividing a range of movement into a plurality of sections corresponding to different types of patterns, a configuration of a position error curve repeating with same pattern;

first memory means storing position coordinates of a start point and an end point in each divided section and a length of one period of a repeating pattern in said divided section;

second division means for dividing each of said plurality of sections into a plurality of shorter sections with respect to a length of one period of each pattern;

second memory means storing position error in one of said shorter sections obtained by dividing a length of one period of each pattern in accordance with types of respective patterns;

means for supervising a present position of said movable member corresponding to an instructed position;

means for judging whether a supervised position lies in one of divided sections by using data stored in said first and second memory means;

means for judging whether said supervised position lies in one of said shorter sections in one period of said pattern; and a position compensation quantity calculating unit for calculating a position error in one shorter section in which said movable member is located by using a value of a position error stored corresponding to each shorter section of each pattern thereby compensating the position of said movable member by a calculated position compensating quantity.

* * * * *